US007801631B2

(12) United States Patent
Choi

(10) Patent No.: US 7,801,631 B2
(45) Date of Patent: Sep. 21, 2010

(54) DIGITAL MULTIMEDIA BROADCASTING RECEIVER FOR PRESET RECORDING AND METHOD THEREOF

(75) Inventor: Sung-Eun Choi, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 468 days.

(21) Appl. No.: 11/474,569

(22) Filed: Jun. 26, 2006

(65) Prior Publication Data

US 2007/0017347 A1 Jan. 25, 2007

(30) Foreign Application Priority Data

Jul. 19, 2005 (KR) ...................... 10-2005-0065389
Jul. 22, 2005 (KR) ...................... 10-2005-0067031

(51) Int. Cl.
*G06F 17/00* (2006.01)

(52) U.S. Cl. ........................................................ 700/94

(58) Field of Classification Search .................... 700/94
See application file for complete search history.

(56) References Cited

U.S. PATENT DOCUMENTS 6,208,799 B1 * 3/2001 Marsh et al. .................. 386/83
6,301,603 B1 * 10/2001 Maher et al. ................ 718/105
7,054,697 B1 * 5/2006 Nishiwaki et al. ............. 700/94
7,434,247 B2 * 10/2008 Dudkiewicz et al. .......... 725/46
7,565,104 B1 * 7/2009 Brown et al. ............... 455/3.01
2002/0046401 A1 * 4/2002 Miyazaki et al. .............. 725/32
2003/0225834 A1 * 12/2003 Lee et al. ..................... 709/204
2004/0078817 A1 * 4/2004 Horowitz et al. .............. 725/58
2004/0110522 A1 * 6/2004 Howard et al. .............. 455/512
2005/0144637 A1 * 6/2005 Shikata et al. ................ 725/35
2005/0229225 A1 * 10/2005 Klausberger et al. ......... 725/112

(Continued)

FOREIGN PATENT DOCUMENTS

JP 10-336534 12/1998

(Continued)

OTHER PUBLICATIONS

ID3v2 standard: Copyright Mar. 1998.*

*Primary Examiner*—Curtis Kuntz
*Assistant Examiner*—Paul McCord
(74) *Attorney, Agent, or Firm*—The Farrell Law Firm, LLP

(57) ABSTRACT

Disclosed is a digital multimedia broadcasting receiver for preset recording and a method thereof. The method for preset-recording a song provided through a music channel by using present and follow (P/F) information in a digital multimedia broadcasting receiver includes measuring a time period elapsed from a first time point at which P/F information is updated while a current song is played, when recording is preset, and calculating a first interval time by subtracting the first time point from an ending time of the currently-played song; starting recording a next-played song, when the time period measured from the first time point reaches the first calculated interval time measuring a time period elapsed from a second time point at which P/F information is updated during preset recording, and calculating a second interval time by subtracting the second time point from an ending time of the song being preset recorded; and ending recording the song being preset-recorded, when the time period measured from the second time point reaches the second calculated interval time.

28 Claims, 5 Drawing Sheets

U.S. PATENT DOCUMENTS

| | | | | |
|---|---|---|---|---|
| 2006/0064721 | A1* | 3/2006 | Del Val et al. | 725/41 |
| 2006/0095543 | A1* | 5/2006 | Ito et al. | 709/218 |
| 2006/0167574 | A1* | 7/2006 | Kawakami | 700/94 |
| 2006/0174293 | A1* | 8/2006 | Ducheneaut et al. | 725/90 |
| 2006/0190978 | A1* | 8/2006 | Russ et al. | 725/110 |
| 2006/0253865 | A1* | 11/2006 | Lee et al. | 725/39 |

FOREIGN PATENT DOCUMENTS

| | | |
|---|---|---|
| JP | 09-180294 | 7/1999 |
| JP | 11-177511 | 7/1999 |
| JP | 2000-050216 | 2/2000 |
| JP | 2000-123440 | 4/2000 |
| JP | 2001-144699 | 5/2001 |
| JP | 2004-534978 | 11/2004 |
| JP | 2006-148939 | 6/2006 |
| WO | WO 02/43353 | 5/2002 |

* cited by examiner

DIGITAL MULTIMEDIA BROADCASTING RECEIVER FOR PRESET RECORDING AND METHOD THEREOF

PRIORITY

This application claims the benefit under 35 U.S.C. 119(a) of an application entitled "Digital Multimedia Broadcasting Receiver For Preset Recording And Method Thereof" filed in the Korean Intellectual Property Office on Jul. 19 and 22, 2005 and assigned Ser. Nos. 2005-65389 and 2005-67031, respectively, the entire contents of which are incorporated herein by reference.

BACKGROUND OF THE INVENTION

1. Field of the Invention

The present invention relates to a digital multimedia broadcasting, and more particularly to a digital multimedia broadcasting receiver for preset recording and a method thereof.

2. Description of the Related Art

Channels for digital multimedia broadcasting are divided into video channels and audio channels, and the audio channels are again divided into voice channels and music channels. The music channel continuously provides music 24 hours every day, and allows the user to preset a record function per each song. Preset recording represents a function to set recording of a song following the currently-played song through a music channel. A song preset to be recorded may be stored as a music file named "title (singer name)" in a memory of the digital multimedia broadcasting receiver. In the case in which an automatic preset-recording function is set, the preset recording for the next song is also automatically preset when the recording of the current song preset to be recorded is initiated. The user may activate the automatic preset-recording function through an environment set menu in the digital multimedia broadcasting receiver. The method for presetting the recording of a song received through a music channel in a mobile terminal capable of receiving a digital multimedia broadcast will now be described in detail with reference to FIG. 1.

FIG. 1 is a block diagram illustrating the construction of only a preset recording function in a conventional mobile terminal capable of receiving a digital multimedia broadcast.

The mobile terminal includes a central processing unit (CPU) 100, which supports various multimedia functions as well as voice and data communication functions. The central processing unit 100 controls a multimedia module 200 to provide a digital multimedia broadcasting service to the user. That is, the central processing unit 100 controls the preset recording for songs of a music channel, which are provided through the multimedia module 200. For instance, when the preset recording for a predetermined song provided through the music channel is set, the central processing unit 100 extracts data about the starting time and ending time of the predetermined song from present and follow (P/F) information which is included in an event information table (EIT) of an electronic program guide (EPG).

The P/F information is updated before the current song changes to the next song, and includes data about the titles, the singer names, and the starting and ending times for the current song and next song. Therefore, data about the ending time of the current song preset to be recorded is included in the P/F information, which has been updated while the song previous to the current song is played. The central processing unit 100 extracts data about the starting and ending times of a song preset to be recorded from the P/F information, which has been updated before the song preset to be recorded is output. Then, the central processing unit 100 transmits a control signal to instruct the start of recording to the multimedia module 200 when the current time reaches the extracted starting time, thereby directing the multimedia module 200 to start the recording. Next, when the current time reaches the extracted ending time, the central processing unit 100 transmits a control signal to instruct the end of recording to the multimedia module 200, thereby directing the multimedia module 200 to stop the recording.

Meanwhile, the control signals from the central processing unit 100 to the multimedia module 200 are transmitted through inter-process communication (IPC). When the current time reaches the starting time of a song preset to be recorded, the central processing unit 100 transmits a control signal for the start of recording to the multimedia module 200 through IPC, so that the multimedia module 200 starts recording the desired song. However, the time point, at which the multimedia module 200 receives a control signal for the start of recording, may occur after a predetermined time has lapsed from the current time, that is, the time point is later than the starting time of the song preset to be recorded due to a time delay caused by the IPC. As a result, when the user reproduces the preset-recorded song in the future, the user cannot listen to the beginning of the song, as it has not been recorded. Also, in the case of the ending time for a song preset being recorded, since the multimedia module 200 receives a control signal for the end of recording from the central processing unit 100 at a time point later than the actual ending time of the song preset being recorded, due to a time delay caused by the IPC, the multimedia module 200 continues the recording of a song for a period of time after the playing of the song being preset-recorded has ended.

SUMMARY OF THE INVENTION

Accordingly, the present invention has been made to solve the above-mentioned problems occurring in the prior art, and an object of the present invention is to provide a digital multimedia broadcasting receiver and method capable of exactly controlling the time point for preset recording.

To accomplish this object, in accordance with one aspect of the present invention, there is provided a method for preset-recording a song provided through a music channel by using present and follow (P/F) information in a digital multimedia broadcasting receiver, the method including measuring a time period elapsed from a first time point at which P/F information is updated while a current song is played, when recording is preset, and calculating first interval time by subtracting the first time point from an ending time of the currently-played song; starting recording a next-played song, when the time period measured from the first time point reaches the first calculated interval time; measuring a time period elapsed from a second time point at which P/F information is updated during preset recording, and calculating a second interval time by subtracting the second time point from an ending time of the song being reset recorded; and ending recording the song being preset-recorded, when the time period measured from the second time point reaches the second calculated interval time In accordance with another aspect of the present invention, there is provided a digital multimedia broadcasting receiver for preset-recording a song provided through a music channel by using present & follow (P/F) information, the digital multimedia broadcasting receiver includes a timer for measuring a first time period elapsed from a first time point at which P/F information is updated while a current song is played, when preset recording is set, and measuring a second time period elapsed from a second time point at which P/F information is updated during preset recording; and a control unit for starting recording a next-played song, when the first time period measured from the first time point reaches a first interval time obtained by subtracting the first time point from an ending time of the currently-played song when the preset recording is set, and ending recording of the song being recorded, when the second time period measured from the second time point reaches a second interval time obtained by subtracting the second time point from an ending time of the song being recorded.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Figure 1:
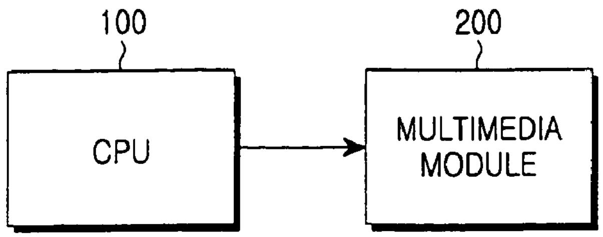
FIG.1 (PRIOR ART)
FIG. 1 is a block diagram illustrating the construction for a preset recording function in a conventional mobile terminal capable of receiving a digital multimedia broadcast.

Hereinafter, a preferred embodiment of the present invention will be described with reference to the accompanying drawings. It is to be noted that the same elements are indicated with the same reference numerals throughout the drawings. In the following description of the present invention, a detailed description of known functions and configurations incorporated herein will be omitted when it may obscure the subject matter of the present invention.

Figure 2:
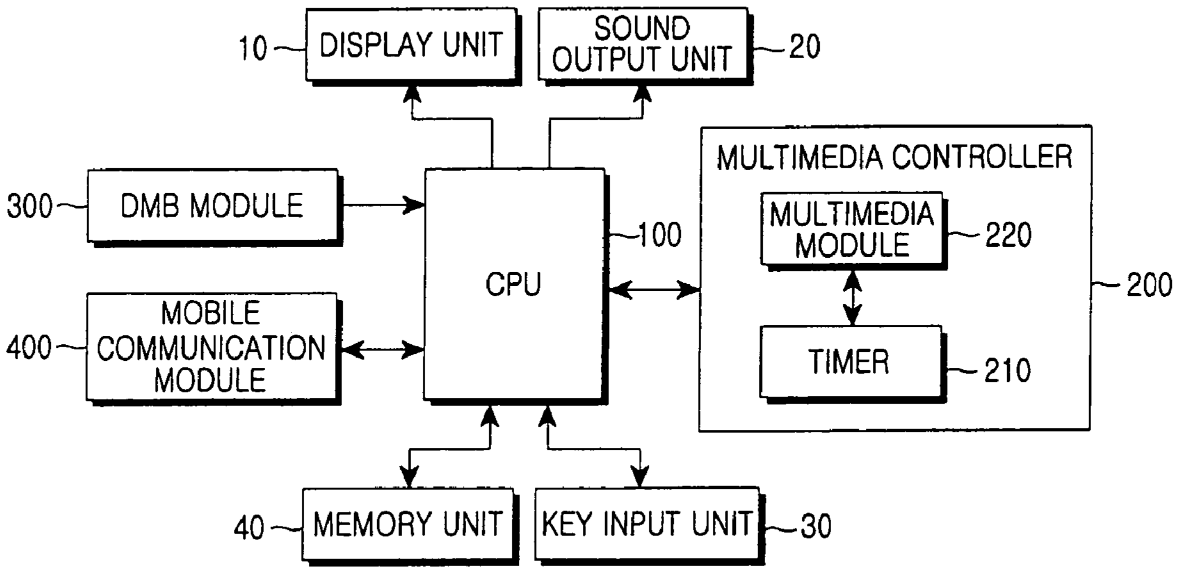
FIG. 2 is a block diagram illustrating the construction of a mobile terminal capable of receiving a digital multimedia broadcast according to the present invention.

FIG. 2 is a block diagram illustrating the construction of a mobile terminal capable of receiving a digital multimedia broadcast according to the present invention.

A digital multimedia broadcasting (DMB) module 300 receives digital multimedia broadcasting data through a channel selected by a central processing unit 100, and demodulates and decodes the received broadcasting data, thereby converting the received broadcasting data into image and sound data to be seen and listened to by the user. In addition, when the currently-selected channel is a music channel, the DMB module 300 receives P/F information updated before an output song is changed from one to the next, and provides the received P/F information to the central processing unit 100. A mobile communication module 400 receives a general communication-related signal and wireless data through an antenna, and outputs the received signal and data to the central processing unit 100. Also, the mobile communication module 400 transmits a general communication-related signal and wireless data, which are output from the central processing unit 100, through an antenna. A display unit 10 displays image data output from the DMB module 300 under the control of the central processing unit 100, and a sound output unit 20 outputs sound data output from the DMB module 300 under the control of the central processing unit 100. A key input unit 30 includes a predetermined key for using a digital multimedia broadcasting service, and the signal of the predetermined key is provided to the central processing unit 100 when the user operates the predetermined key. A memory unit 40 stores a recorded song from among songs provided to the mobile terminal through the music channel for digital multimedia broadcasting, as a music file named, for example, "title (singer name)", and stores P/F information received through the DMB module 300.

When a currently-selected channel is a music channel, the central processing unit 100 receives digital multimedia broadcasting data of the music channel through the DMB module 300, and demodulates and decodes the received broadcasting data to generate sound data, and outputs the generated sound data through the sound output unit 20. The central processing unit 100 extracts information about the title and singer name of a currently-played song and of a next-played song, from P/F information which has been received through the DMB module 300 and stored in the memory unit 40. Then, the central processing unit 100 generates a music channel broadcasting screen and a mini-EPG screen by using the extracted information, thereby displaying the generated screens through the display unit 10 of FIG. 2. The music channel broadcasting screen and mini-EPG screen will now be described in detail with reference to FIGS. 3 to 7.

Figure 3:
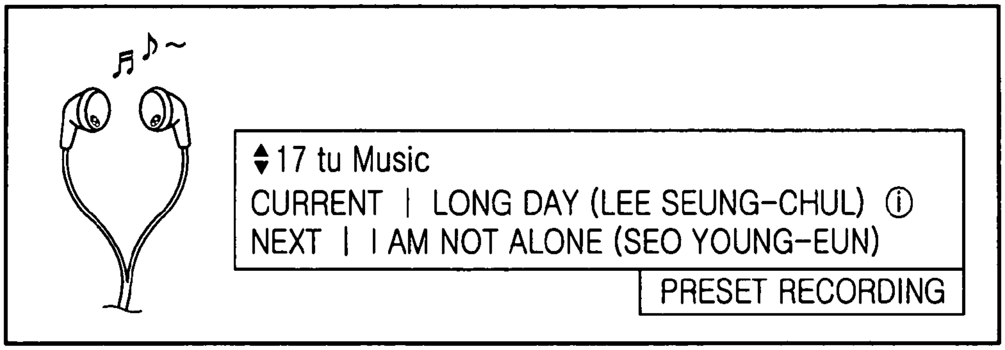
FIGS. 3 to 7 illustrate screens provided for a music channel according to the present invention.
Figure 4:
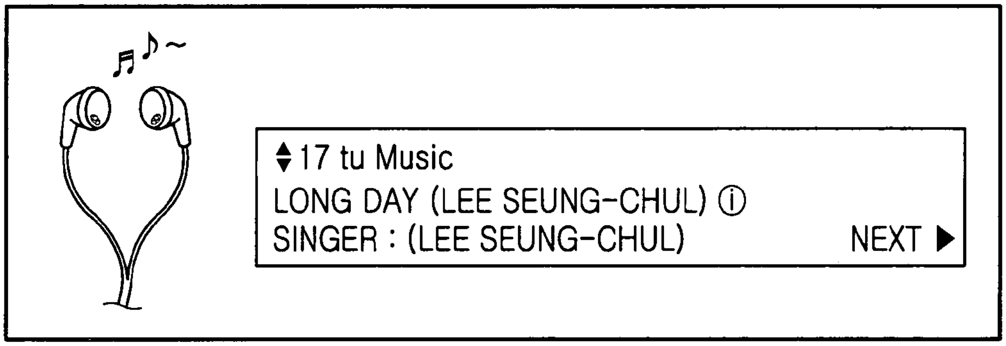
Figure 5:
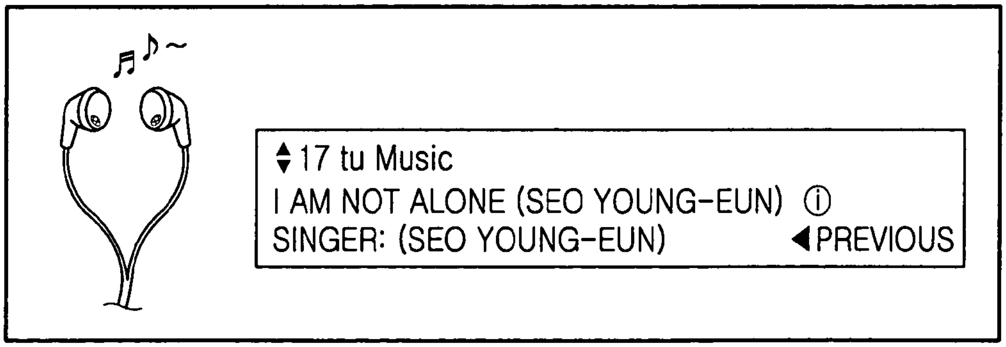

The central processing unit 100 displays a currently-selected music channel number, the title and singer number of a currently-played song (hereinafter, referred to as "current song"), and the title and singer number of a next-played song (hereinafter, referred to as "next song"), in a music broadcasting background screen, as shown in FIG. 3, through the display unit 10 of FIG. 2. When a preset recording function is not set, the central processing unit 100 displays a message such as "Preset Recording", which represents that the preset recording function can be set, in the music broadcasting background screen. Also, when the user operates a menu key for entering a mini-EPG screen in the state as shown in FIG. 3, the key input unit 30 of FIG. 2 provides a signal corresponding to the menu key to the central processing unit 100. Then, the central processing unit 100 displays a mini-EPG screen, which includes the currently-selected music channel number, and the title and singer name of the current song, through display unit 10, as shown in FIG. 4. When a right directional key is selected in the state as shown in FIG. 4, a mini-EPG screen for the next song is displayed as shown in FIG. 5. When a left directional key is selected in the state as shown in FIG. 5, the mini-EPG screen for the current song is again displayed as shown in FIG. 4. That is, when the user operates the right directional key in the state of FIG. 4, the key input unit 30 provides a signal corresponding to the right directional key to the central processing unit 100. Then, the central processing unit 100 displays the mini-EPG screen for the next song through the display unit 10, as shown in FIG. 5.

Figure 6:
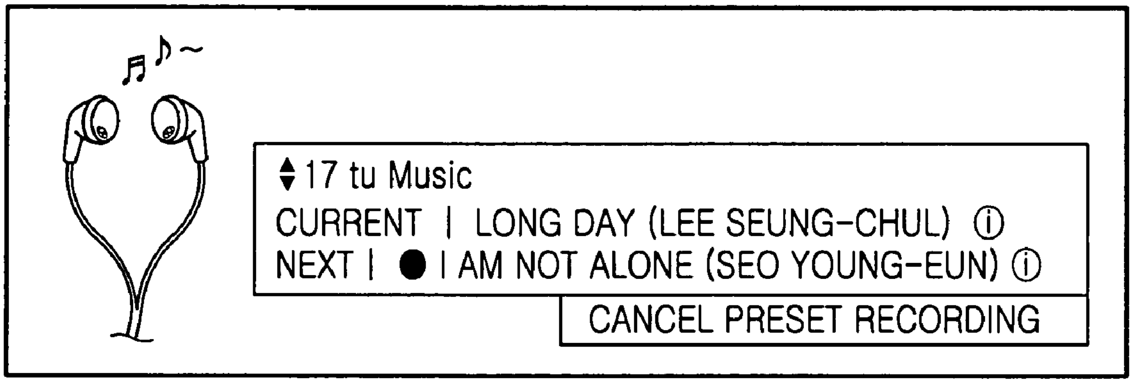
Figure 7:
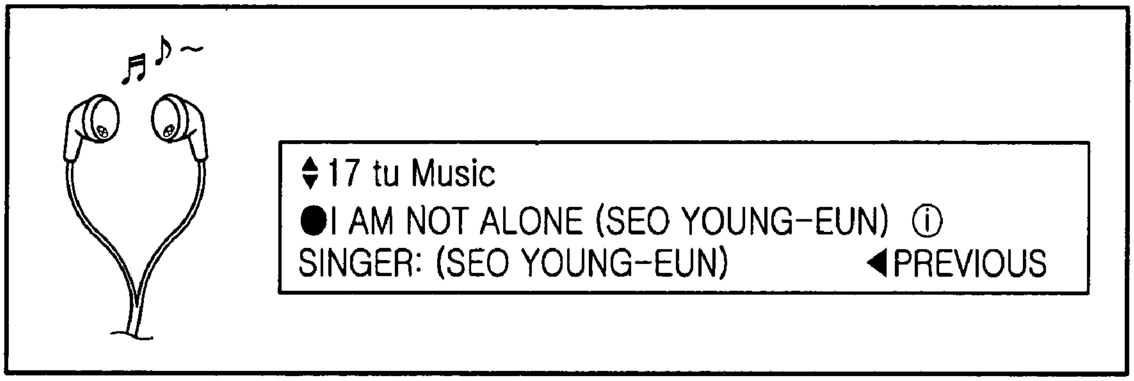

While listening to a song played through the sound output unit 20 on a currently-selected music channel, the user may check the next song through the display unit 10, and can preset the recording of the next song if the user desires. When the user operates a predetermined key for preset recording, the key input unit 30 provides a signal corresponding to the predetermined key to the central processing unit 100. Then, the central processing unit 100 displays an icon at the front of the title of the next song in the music broadcasting background screen in order to represent that the recording for the next song has been preset, and replaces the message "Preset Recording" representing that the recording can be preset, with a message such as "Cancel Preset Recording" which represents that the user may cancel the preset recording, as shown in FIG. 6. In this case, the central processing unit 100 also displays an icon at the front of the title of the next song in the mini-EPG screen for the next song, as shown in FIG. 7.

The central processing unit 100 transmits a control signal, which instructs that the recording for the next song has been preset, to a multimedia module 200. According to the present invention, the multimedia module 200 includes a timer 210 and a multimedia controller 220 as shown in FIG.2, in order to exactly control the time points for preset recording. According to the present invention, when the control signal representing the preset recording is transmitted from the central processing unit 100, the following control operation for preset recording by the multimedia controller 220 and timer 210 is performed differently from the prior art in which the entire operation for preset recording is performed by the central processing unit 100. The method for performing the preset recording by means of the multimedia controller 220 and timer 210 according to the present invention will now be described in detail below.

When P/F information has been updated while the current song is played, the timer 210 starts time-counting at this time point, and the multimedia controller 220 calculates a first interval time by subtracting the updated time point of the P/F information from the ending time of the current song. Data about the ending time of the current song are included in P/F information updated before the previous song has been changed to the current song. When a time period counted by the timer 210 has reached the first interval time, the multimedia controller 220 starts recording the next-played song. Since, the time period counted by the timer 210 has reached the first interval time, the starting time for recording the next-played song is identical to the ending time of the currently-played song, which has been included in the P/F information updated before the previous song changes to the currently-played song. That is, since the control operation for preset recording is performed by the multimedia controller 220, differently from the prior art of using the central processing unit 100, it is possible to solve the problem of a time delay caused by IPC. Therefore, it is possible to solve the conventional problem whereby the beginning of a song preset to be recorded is not reproduced when the user reproduces the song, which has been recorded by the preset recording function, in the future.

In addition, when the P/F information has been updated in the course of preset-recording a current song, the timer 210 starts time-counting at this time point, and the multimedia controller 220 calculates a second interval time by subtracting the updated time point of the P/F information from the ending time of the current song preset to be recorded. Data about the ending time of the current song preset to be recorded are included in the P/F information updated before the previous song changes to the current song preset to be recorded. When a time period counted by the timer 210 has reached the calculated second interval time, the multimedia controller 220 ends the recording of the song preset to be recorded.

Since the time period counted by the timer 210 has reached the second interval time, the ending time for recording the preset-recorded song is identical to the ending time of the song preset to be recorded, which has been included in the P/F information updated before the previous song changes to the current song preset to be recorded. That is, the multimedia controller 220 can precisely end the recording of a song being recorded at its ending time based on the P/F information. Therefore, it is possible to solve a prior problem that the recording for a song preset to be recorded is ended at a predetermined period of time after the song preset to be recorded has stopped being outputted.

Meanwhile, an automatic preset-recording function is set to preset the recording for the song next to the current song being recorded, the multimedia controller 220 starts the recording for the next song at the ending time of the current song being preset-recorded, as the above-mentioned manner. That is, when the recording for continuous songs are preset according to the automatic preset-recording function, the recording for a preset song is precisely ended based on P/F information, and simultaneously the preset recording for the next-played song starts. The method for preset-recording a song provided through a music channel will be described in detail with reference to FIG. 8, which sequentially shows continuously-played songs as a function of time.

Figure 8:
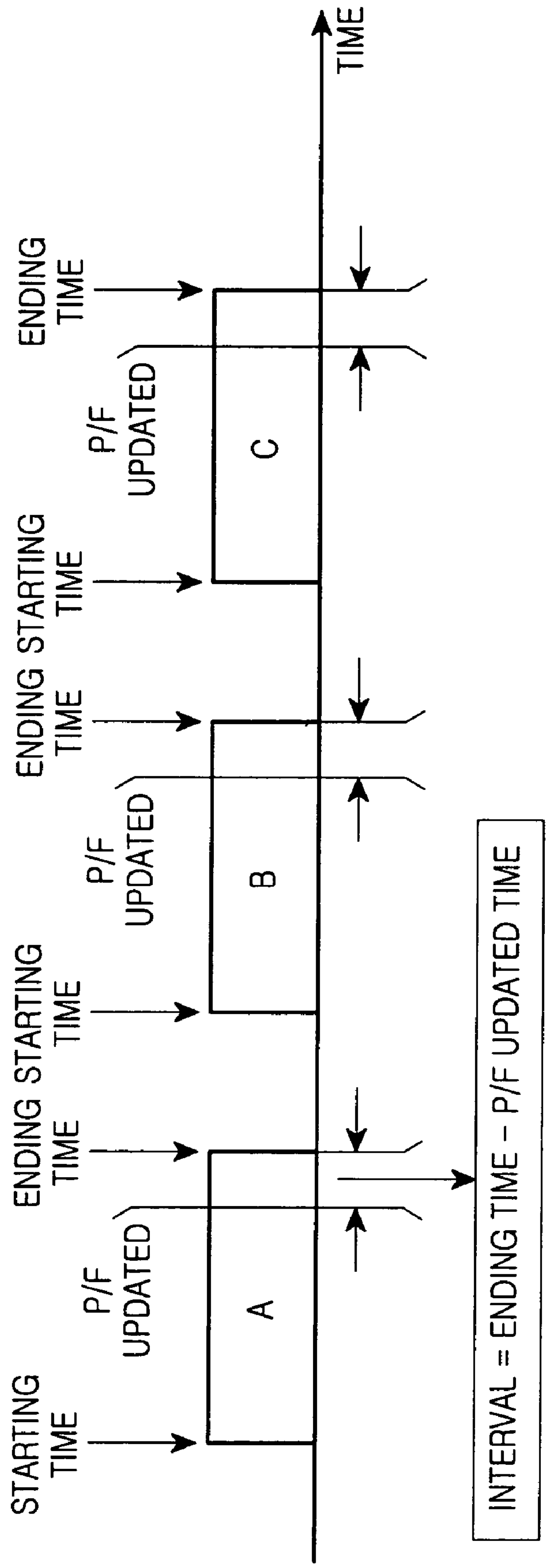
FIG. 8 is a timing view explaining the method of preset-recording a song provided through a music channel according to the present invention.

FIG. 8 is a timing view explaining the method of preset-recording a song provided through a music channel according to the present invention.

Herein, it is assumed that a previously-played song (previous song) is song "A", a currently-played song (current song) is song "B", and a next-played song (next song) is song "C". Data of the starting time and ending time of each song are included in P/F information, which has been updated before an output song changes to each song from its previous song. That is, data of the starting time and ending time of the current song "B" are included in P/F information, which has been updated before the previous song "A" changes to the current song "B". Also, data of the starting time and ending time of the next song "C" are included in P/F information, updated before the current song "B" changes to the next song "C".

While listening to the current song "B" output through the sound output unit 20, the user checks the next song "C" through the display unit 10, and determines the recording of the next song "C". In this case, when the user operates a predetermined key to preset recording, the key input unit 30 provides a signal corresponding to the predetermined key to the central processing unit 100. Then, the central processing unit 100 directs a mini-EPG screen and a music broadcasting background screen to display that the preset recording for the next song has been set, as shown in FIGS. 6 and 7.

Next, the central processing unit 100 transmits a control signal, which instructs the recording for the next song "C", to a multimedia module 200. When the multimedia module 200 receives the control signal for the preset recording from the central processing unit 100, the timer 210 checks whether P/F information has been updated in the course of playing the current song "B", and starts time-counting at the precise moment when P/F information has been updated. Then, the multimedia module 200 calculates a first interval time by subtracting the updated time point of P/F information from the ending time of the current song "B". Data about the ending time of the current song "B" are included in P/F information, which has been updated before the previous song "A" changes to the current song "B". Thereafter, when a time period counted by the timer 210 has reached the first interval time, the multimedia controller 220 starts recording the next song "C". Since the time period counted by the timer 210 has reached the first interval time, the starting time for recording the next song "C" is identical to the ending time of the current song "B", which has been included in the P/F information updated before the previous song "A" changes to the current song "B".

In addition, the timer 210 checks whether or not P/F information has been updated in the course of preset-recording the song "C", and starts time-counting at the precise moment when P/F information has been updated. Then, the multimedia module 200 calculates a second interval time by subtracting the updated time point of P/F information from the ending time of the song "C". Data about the ending time of the song "C" are included in P/F information, updated before the song "B" changes to the song "C". Thereafter, when a time period counted by the timer 210 has reached the second interval time, the multimedia controller 220 ends the recording of the song "C".

Figure 9:
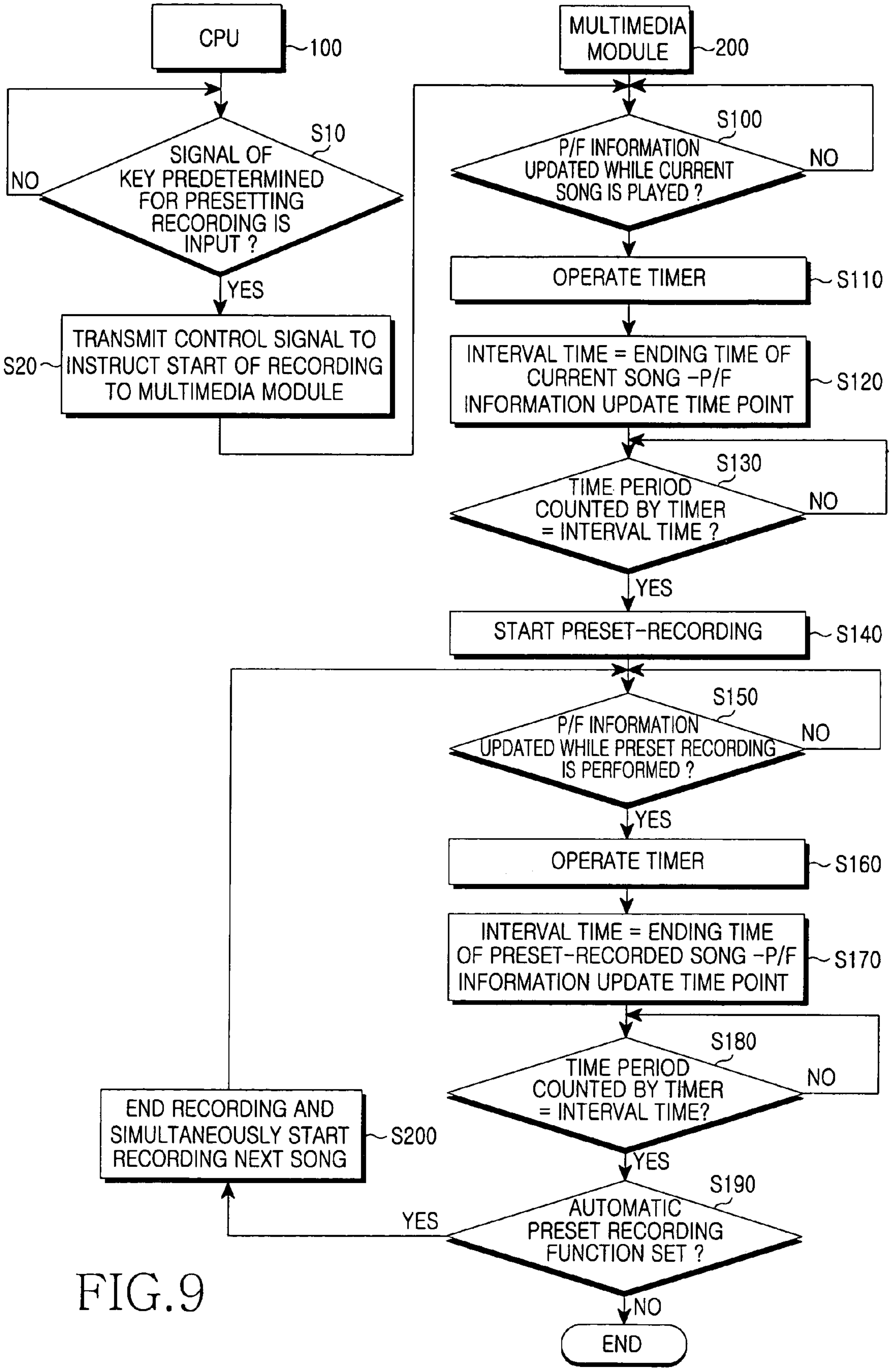
FIG. 9 is a flowchart illustrating a procedure for preset-recording according to the present invention.

Since the time period counted by the timer 210 has reached the second interval time, the ending time for recording the song "C" is identical to the ending time of song "C", included in the P/F information updated before the song "B" changes to the song "C". A method for preset-recording a song at a precise time point in a digital multimedia broadcasting receiver will now be described in detail with reference to the flowchart shown in FIG. 9 according to the present invention.

When the user of the digital multimedia broadcasting receiver selects a music channel, digital multimedia broadcasting data are received through a music channel tuned by the DMB module 300, and demodulated and decoded to generate sound data. Then, the central processing unit 100 outputs the generated sound data through the sound output unit 20. Also, the central processing unit 100 extracts information about the title and singer name of a currently-played song and of a next-played song, from P/F information which is received through the DMB module 300 and stored in the memory unit 40. Then, the central processing unit 100 generates a music channel broadcasting screen and a mini-EPG screen by using the extracted information,.and displays the generated screens through the display unit 10. Therefore, while listening to a song played through the sound output unit 20 on a currently-selected music channel, the user can check information about the current song and the next song through the music channel broadcasting screen or mini-EPG screen displayed through the display unit 10.

The user checks the next song through the display unit 10, and can operate a predetermined key in order to preset recording if the user desires to record the next song. When the user operates the predetermined key to preset the recording, the key input unit 30 provides a signal corresponding to the predetermined key to the central processing unit 100. Then, the central processing unit 100, which is providing the digital multimedia broadcasting service for the music channel through the sound output unit 20 and the display unit 10, checks whether the signal of a predetermined key for preset recording is input through the key input unit 30 (step S10).

When it is determined in step S10 that the signal of the predetermined key for preset recording is input through the key input unit 30, the central processing unit 100 transmits a control signal to the multimedia module 200 in order to instruct the preset-recording for the next song (step S20). Also, the central processing unit 100 directs a mini-EPG screen and a music broadcasting background screen to display that the recording of the next song has been preset, as shown in FIGS. 6 and 7. After step 20, the following control operation for the preset recording is performed by the multimedia module 200, not by the central processing unit 100.

When the multimedia module 200 receives the control signal for the preset recording from the central processing unit 100, the multimedia controller 220 of the multimedia module 200 checks whether P/F information has been updated while the current song is played (step S100). When it is determined in step 100 that P/F information has been updated, the multimedia controller 220 operates the timer 210 to count a time period from the updated time point (step SI 10). Also, the multimedia controller 220 calculates a first interval time by subtracting the updated time point of P/F information from the ending time of the current song (step S120). Data about the ending time of the current song are included in P/F information, which has been updated before the previous song changes to the current song. After the timer 210 is operated and the first interval time is simultaneously calculated, the multimedia controller 220 checks whether the time period counted by the timer 210 has reached the first interval time (step S130).

When it is determined in step 130 that the time period counted by the timer 210 has reached the first interval time, the multimedia controller 220 starts recording the next song (step S140). Since the time period counted by the timer 210 has reached the first interval time, the starting time for recording the next song is identical to the ending time of the current song, included in the P/F information updated before the previous song changes to the current song.

Then, the multimedia controller 220 checks whether P/F information has been updated in the course of preset-recording the next song (step S150). When it is determined in step S150 that P/F information has been updated, the multimedia controller 220 operates the timer 210 to count a time period from the updated time point (step S160). Also, the multimedia controller 220 calculates a second interval time by subtracting the updated time point of P/F information from the ending time of the song preset to be recorded (step S170). Data about the ending time of the song preset to be recorded are included in P/F information, updated before the previous song changes to the song preset to be recorded. After the timer 210 is operated and the second interval time is simultaneously calculated, the multimedia controller 220 checks whether the time period counted by the timer 210 has reached the second interval time (step S180).

When it is determined in step 180 that the time period counted by the timer 210 has reached the second interval time, the multimedia controller 220 checks whether an automatic preset-recording function has been set (step S190). When it is determined in step S190 that the automatic preset-recording function has been set, the multimedia controller 220 ends the recording of the song preset to be recorded, simultaneously starts recording a following song (step S200), and then returns to step S150. Meanwhile, since the time period counted by the timer 210 in step S190 has reached the second interval time, the ending time for recording the preset-recorded song is identical to the ending time of the song preset to be recorded, which has been included in the P/F information updated before the previous song changes to the song preset to be recorded.

According to the present invention as described above herein, the starting and ending times for preset recording are precisely adjusted, so that the user can precisely record a song preset to be recorded.

While the present invention has been shown and described with reference to certain preferred embodiments thereof, it will be understood by those skilled in the art that various changes in form and details may be made therein without departing from the spirit and scope of the invention as defined by the appended claims. Accordingly, the scope of the invention is not to be limited by the above embodiments but by the claims and the equivalents thereof.

What is claimed is:

1. A method for preset-recording a song provided through a music channel by using Present and Follow (P/F) information in a digital multimedia broadcasting receiver, the method comprising the steps of:

transmitting, by a central processing unit, a control signal to instruct a multimedia module that a preset recording for a next song has been set;

measuring, by a timer included in the multimedia module, a time period elapsed from a first time point at which P/F information is updated while a current song is played, when recording is preset, and calculating a first interval time by subtracting the first time point from an ending time of the currently-played song;

starting, by a multimedia controller included in the multimedia module, recording of a next-played song, when the time period measured from the first time point reaches the first calculated interval time;

measuring, by the timer, a time period elapsed from a second time point at which P/F information is updated during preset recording, and calculating a second interval time by subtracting the second time point from an ending time of the song being preset recorded; and ending, by the multimedia controller, recording of the song being preset-recorded, when the time period measured from the second time point reaches the second calculated interval time.

2. The method as claimed in claim 1, wherein the ending time of the currently-played song is extracted from P/F information which is updated before a previous song changes to the currently-played song.

3. The method as claimed in claim 1, wherein the ending time of the song being preset-recorded is extracted from the P/F information updated at the first time point.

4. The method as claimed in claim 1, further comprising:

checking whether an automatic preset-recording function is set; and ending the recording of the song being preset-recorded while simultaneously starting preset-recording a following song, when the automatic preset-recording function is set.

5. The method as claimed in claim 1, further comprising:

extracting information about a title and a singer name of the currently-played song and of the next-played song, from the P/F information; and displaying a music channel broadcasting screen, which provides the information about the title and singer name of the currently-played song and of the next-played song, based on the extracted information.

6. The method as claimed in claim 5, further comprising displaying a mini Electronic Program Guide (mini-EPG) screen, which provides the information about the title and singer name of the currently-played song, based on the extracted information.

7. The method as claimed in claim 6, wherein the mini-EPG screen for the currently-played song is displayed when a menu key to enter the mini-EPG screen is operated in the music channel broadcasting screen.

8. The method as claimed in claim 7, further comprising displaying a mini-EPG screen, which provides the information about the title and singer name of the next-played song, based on the extracted information.

9. The method as claimed in claim 8, wherein the mini-EPG screen for the next-played song is displayed, when a predetermined key to enter the mini-EPG screen for the next-played song is operated in the mini-EPG screen for the currently-played song.

10. The method as claimed in claim 8, wherein the mini-EPG screen for the currently-played song is displayed, when the predetermined key to enter the mini-EPG screen for currently-played song is operated in the mini-EPG screen for the next-played song.

11. The method as claimed in claim 5, further comprising displaying an indicator, which represents that preset recording for the next-played song has been set, in the music channel broadcasting screen, when the preset recording has been set.

12. The method as claimed in claim 8, further comprising displaying an indicator, which represents that preset recording for the next-played song has been set, in the mini-EPG screen for the next-played song, when the preset recording has been set.

13. The method as claimed in claim 5, further comprising displaying a message, which represents that preset recording can be set, in the music channel broadcasting screen, when preset recording is not yet set.

14. The method as claimed in claim 5, further comprising displaying a message, which represents that preset recording can be canceled, in the music channel broadcasting screen, when the preset recording has been set.

15. A digital multimedia broadcasting receiver for preset-recording a song provided through a music channel by using Present and Follow (P/F) information, the digital multimedia broadcasting receiver comprising:

a multimedia module including a timer and a multimedia controller;

a central processing unit for transmitting a control signal to instruct the multimedia module that a preset recording for a next song has been set;

the timer for measuring a first time period elapsed from a first time point at which P/F information is updated while a current song is played, when preset recording is set, and measuring a second time period elapsed from a second time point at which P/F information is updated during preset recording; and the multimedia controller for starting recording a next-played song, when the first time period measured from the first time point reaches a first interval time obtained by subtracting the first time point from an ending time of the currently-played song when the preset recording is set, and ending recording of the song being recorded, when the second time period measured from the second time point reaches a second interval time obtained by subtracting the second time point from an ending time of the song being recorded.

16. The digital multimedia broadcasting receiver as claimed in claim 15, wherein the multimedia controller ends the recording of the song being preset-recorded and simultaneously starts preset-recording a following song, when an automatic preset-recording function is set.

17. The digital multimedia broadcasting receiver as claimed in claim 15, further comprising a memory for storing updated P/F information, wherein the central processing unit extracts the ending time of the currently-played song from P/F information, which has been updated before a previously-played song changes to the currently-played song, and has been stored in the memory.

18. The digital multimedia broadcasting receiver as claimed in claim 17, wherein the central processing unit extracts the ending time of the song being preset-recorded from P/F information, which has been updated at the first time point and has been stored in the memory.

19. The digital multimedia broadcasting receiver as claimed in claim 17, further comprising a display unit for displaying a music channel broadcasting screen and a mini Electronic Program Guide (mini-EPG) screen, wherein the central processing unit extracts information about a title and a singer name of the currently-played song and of the next-played song, from P/F information stored in the memory, and displays the extracted information in the music channel broadcasting screen through the display unit.

20. The digital multimedia broadcasting receiver as claimed in claim 17, wherein the central processing unit extracts information about a title and a singer name of the currently-played song, from P/F information stored in the memory, and displays the extracted information in a mini-EPG screen through the display unit.

21. The digital multimedia broadcasting receiver as claimed in claim 17, wherein the central processing unit extracts information about a title and a singer name of the next-played song, from P/F information stored in the memory, and displays the extracted information in a mini-EPG screen through the display unit.

22. The digital multimedia broadcasting receiver as claimed in claim 21, further comprising a key input unit including a menu key for entering a mini-EPG screen from a music channel broadcasting screen, a predetermined key for switching mini-EPG screens for the currently-played song and the next-played song from one to another, wherein the central processing unit displays a mini-EPG screen for the currently-played song, when the menu key for entering the mini-EPG screen is operated through the key input unit.

23. The digital multimedia broadcasting receiver as claimed in claim 22, wherein, when the predetermined key for switching the mini-EPG screens is operated through the key input unit in a state in which the mini-EPG screen for the currently-played song is displayed, the central processing unit switches the mini-EPG screen for the currently-played song to the mini-EPG screen for the next-played song.

24. The digital multimedia broadcasting receiver as claimed in claim 22, wherein, when the predetermined key for switching the mini-EPG screens is operated through the key input unit in a state in which the mini-EPG screen for the next-played song is displayed, the central processing unit switches the mini-EPG screen for the next-played song to the mini-EPG screen for currently-played song.

25. The digital multimedia broadcasting receiver as claimed in claim 19, wherein the central processing unit displays an indicator, which represents that preset recording for the next-played song has been set, in the music channel broadcasting screen, when the preset recording has been set.

26. The digital multimedia broadcasting receiver as claimed in claim 22, wherein the central processing unit displays an indicator, which represents that preset recording for the next-played song has been set, in the mini-EPG screen for the next-played song, when the preset recording has been set.

27. The digital multimedia broadcasting receiver as claimed in claim 19, wherein the central processing unit displays a message, which represents that preset recording can be set, in the music channel broadcasting screen, when preset recording is not yet set.

28. The digital multimedia broadcasting receiver as claimed in claim 19, wherein the central processing unit displays a message, which represents that preset recording can be canceled, in the music channel broadcasting screen, when the preset recording has been set.

* * * * *